(12) United States Patent
Evans et al.

(10) Patent No.: US 9,166,711 B2
(45) Date of Patent: Oct. 20, 2015

(54) METHOD AND SYSTEM TO INFLUENCE A VIEWER TO SELECT A FEED

(75) Inventors: Gregory M. Evans, Raleigh, NC (US); Richard J. Walsh, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1843 days.

(21) Appl. No.: 12/273,595

(22) Filed: Nov. 19, 2008

(65) Prior Publication Data

US 2010/0125887 A1    May 20, 2010

(51) Int. Cl.
| | |
|---|---|
| H04N 7/173 | (2011.01) |
| H04H 20/42 | (2008.01) |
| G06Q 10/06 | (2012.01) |
| G06Q 30/02 | (2012.01) |
| H04L 12/801 | (2013.01) |
| H04N 7/16 | (2011.01) |
| H04N 21/2385 | (2011.01) |
| H04N 21/239 | (2011.01) |
| H04N 21/24 | (2011.01) |
| H04N 21/466 | (2011.01) |
| H04N 21/482 | (2011.01) |
| H04N 21/6543 | (2011.01) |
| H04L 29/08 | (2006.01) |
| H04L 29/06 | (2006.01) |

(52) U.S. Cl.
CPC ............. *H04H 20/423* (2013.01); *G06Q 10/06* (2013.01); *G06Q 30/02* (2013.01); *H04L 47/12* (2013.01); *H04L 67/32* (2013.01); *H04N 7/163* (2013.01); *H04N 7/173* (2013.01); *H04N 21/2385* (2013.01); *H04N 21/2396* (2013.01); *H04N 21/2402* (2013.01); *H04N 21/4668* (2013.01); *H04N 21/482* (2013.01); *H04N 21/6543* (2013.01); *H04L 65/4076* (2013.01)

(58) Field of Classification Search
None
See application file for complete search history.

(56) References Cited

U.S. PATENT DOCUMENTS

| 7,237,250 B2 | 6/2007 | Kanojia et al. |
| 2002/0112238 A1 | 8/2002 | Kanojia et al. |

(Continued)

OTHER PUBLICATIONS

No Author, Motorola White Paper Using Bandwidth More Efficiently with Switched Digital Video, (article), date unknown, 9 pages, http://www.motorola.com/staticfiles/Business/Solutions/Industry%20Solutions/Service%20Providers/Cable%20Operators/Digital%20Headend%20Solutions/Bandwidth%20Efficiency/Switched%20Digital%20Video/_Document/Static%20Files/SwitchedDigital_whitepaper.pdf?pLibItem=1&localeId=33.

(Continued)

*Primary Examiner* — Chenea Smith
(74) *Attorney, Agent, or Firm* — Withrow & Terranova, PLLC

(57) ABSTRACT

A method and apparatus for influencing a viewer to select a second feed. A shared medium is loaded beyond a loading threshold. One or more high viewership feeds being provided over the shared medium are designated preferred feeds, and one or more user devices providing low viewership feeds to viewers are designated candidate user devices. The candidate user devices are instructed to influence their respective viewers to select one of the high viewership feeds. The candidate user devices select a second feed from one or more preferred feeds, and provide information pertaining to the second feed to the viewer.

21 Claims, 5 Drawing Sheets

(56) References Cited

U.S. PATENT DOCUMENTS

| | | |
|---|---|---|
| 2003/0126600 A1 | 7/2003 | Heuvelman |
| 2006/0251116 A1* | 11/2006 | Bedingfield et al. .......... 370/468 |
| 2007/0089127 A1* | 4/2007 | Flickinger et al. ............. 725/32 |
| 2007/0107024 A1* | 5/2007 | Versteeg et al. ................ 725/95 |
| 2007/0153820 A1* | 7/2007 | Gould ........................... 370/432 |
| 2007/0186259 A1* | 8/2007 | Pedlow et al. ................ 725/120 |
| 2007/0186269 A1* | 8/2007 | Malik ........................... 725/135 |
| 2007/0198839 A1* | 8/2007 | Carle et al. ................... 713/176 |
| 2007/0292103 A1* | 12/2007 | Candelore ....................... 386/52 |
| 2008/0184301 A1* | 7/2008 | Boylan et al. ................... 725/40 |
| 2009/0025027 A1* | 1/2009 | Craner ............................ 725/32 |

OTHER PUBLICATIONS

Office Action for Chinese Patent Application No. 200910258438.9, mailed Apr. 15, 2013, 28 pages.

Second Office Action for Chinese Patent Application No. 200910258438.9, mailed Dec. 17, 2013, 19 pages.

* cited by examiner

METHOD AND SYSTEM TO INFLUENCE A VIEWER TO SELECT A FEED

FIELD OF THE INVENTION

This invention relates to providing data over a shared medium, and in particular to conserving usage of the shared medium.

BACKGROUND OF THE INVENTION

Service providers, such as a multiple system operator (MSO), typically provide broadcast television and video on demand services to a large number of subscribers over a shared medium, such as a hybrid fiber coaxial network. Such service providers are increasingly adding non-video services, such as telephone services, audio services, and high speed data access services, over the same shared medium. Because of the finite bandwidth of the shared medium and the large number of subscribers using the shared medium, during peak usage times the shared medium may become loaded to capacity, preventing the service provider from offering a requested service to one or more subscribers. The inability to provide a requested service over the shared medium inevitably leads to subscriber dissatisfaction, and may inhibit the service provider from generating additional revenue, such as when the requested service is a video on demand request from a subscriber.

Until relatively recently a service provider provided all broadcast television channels over the shared medium irrespective of whether each of the television channels had viewers. Consequently, valuable bandwidth of the shared medium might be consumed by one or more channels that have no viewers. With the advent of newer technologies, such as switched digital video, a service provider can now selectively provide channels over the shared medium depending on whether there are viewers of the respective channels. Channels that have no viewers will not be provided over the shared medium, and consequently will not consume bandwidth of the shared medium. This ability to selectively provide broadcast programming on an as-requested basis frees bandwidth of the shared medium for other services. Unfortunately however, a channel must be provided over the shared medium if only a single subscriber requests the channel. Thus, a number of very low viewership programs may utilize the same amount of bandwidth as a number of very high viewership programs. In such a situation, and especially at peak usage times of the shared medium, it is preferable for the service provider if viewers of low viewership programs can be influenced to select high viewership programs, freeing up bandwidth for additional services for other viewers, such as video on demand services.

SUMMARY OF THE INVENTION

The present invention enables a service provider to influence a viewer of a low viewership channel, or feed, to switch to a high viewership feed, freeing up valuable bandwidth on a shared medium. A headend providing feeds over the shared medium determines that a loading threshold of the shared medium is exceeded. The headend determines preferred feeds from those feeds that are currently being provided over the shared medium. The headend also determines one or more candidate user devices currently providing a first feed to a viewer. The headend instructs the one or more candidate user devices to influence their respective viewer to select a preferred feed. The headend sends instructions to a candidate user device along with information regarding the preferred feeds. The candidate user device receives the instructions and the information regarding the preferred feeds. The candidate user device selects a second feed from the preferred feeds, and provides information pertaining to the second feed for display to the viewer. If the viewer requests the second feed, the candidate user device selects the second feed and the headend determines that the first feed is no longer being watched by the viewer. If the first feed has no other viewers, the headend can terminate providing the first feed over the shared medium, freeing up bandwidth for other services.

The loading threshold of the shared medium may comprise any criteria appropriate for a respective service provider and, according to one embodiment of the invention, the loading threshold of the shared medium may comprise one or more of a predetermined ratio of a percentage of bandwidth in-use to a total bandwidth available, a total number of viewers using the shared medium, a predetermined ratio of a number of revenue-generating feeds to a number of non-revenue generating feeds, a predetermined ratio of a number of multicast feeds to a number of unicast feeds, and the ratio of feeds to viewers.

The headend may determine preferred feeds by any suitable method, such as based on a number of viewers of a feed, a time period since the last segment of video associated with a feed began, how long the feed has been active, and current or historical viewership metrics associated with the feed. The headend may determine candidate user devices by any suitable method, including through the use of criteria such as whether the candidate user device is being providing a unicast feed or a multicast feed and, if a unicast feed, whether the unicast feed is a broadcast feed or a revenue producing video on demand feed, starting and ending times of the program currently being provided on the feed, and how long the viewer has been receiving the feed.

The headend may provide instructions and information regarding the preferred feeds directly to the candidate user devices, or via a common metadata multicast feed that is continually monitored by all user devices. The information regarding the preferred feeds can include: a) an activation loading threshold, wherein if the activation loading threshold is exceeded by the current load of the shared medium, a need exists to influence viewers to select a second feed; b) the current load of the shared medium; c) a deactivation loading threshold indicating the need to influence viewers to select a second feed no longer exists; d) specific user device addresses or identifiers identifying candidate user devices; and e) information identifying preferred feeds and metadata associated with the preferred feeds.

The candidate user device may select the second feed randomly from the preferred feeds based on information relating to the viewer, or based on a profile associated with a subscriber. Information pertaining to the second feed provided for display to the viewer may include an overlay that describes the second feed and encourages the viewer to select the second feed, or may provide second content from the second feed to the viewer. The information pertaining to the second feed may be provided in place of first content that was to be provided to the viewer, such as an advertisement, for example. In such case, the candidate user device may identify to the headend the advertisement that was not provided to the viewer so the respective advertiser may be credited, if appropriate. If the information pertaining to the second feed is second content from the second feed, the candidate user device may buffer the second content at the beginning of a video segment of the second feed prior to providing the second content for display to the viewer. The information pertaining to the second feed may include a viewer-selectable feature that enables the viewer to easily select the second feed.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
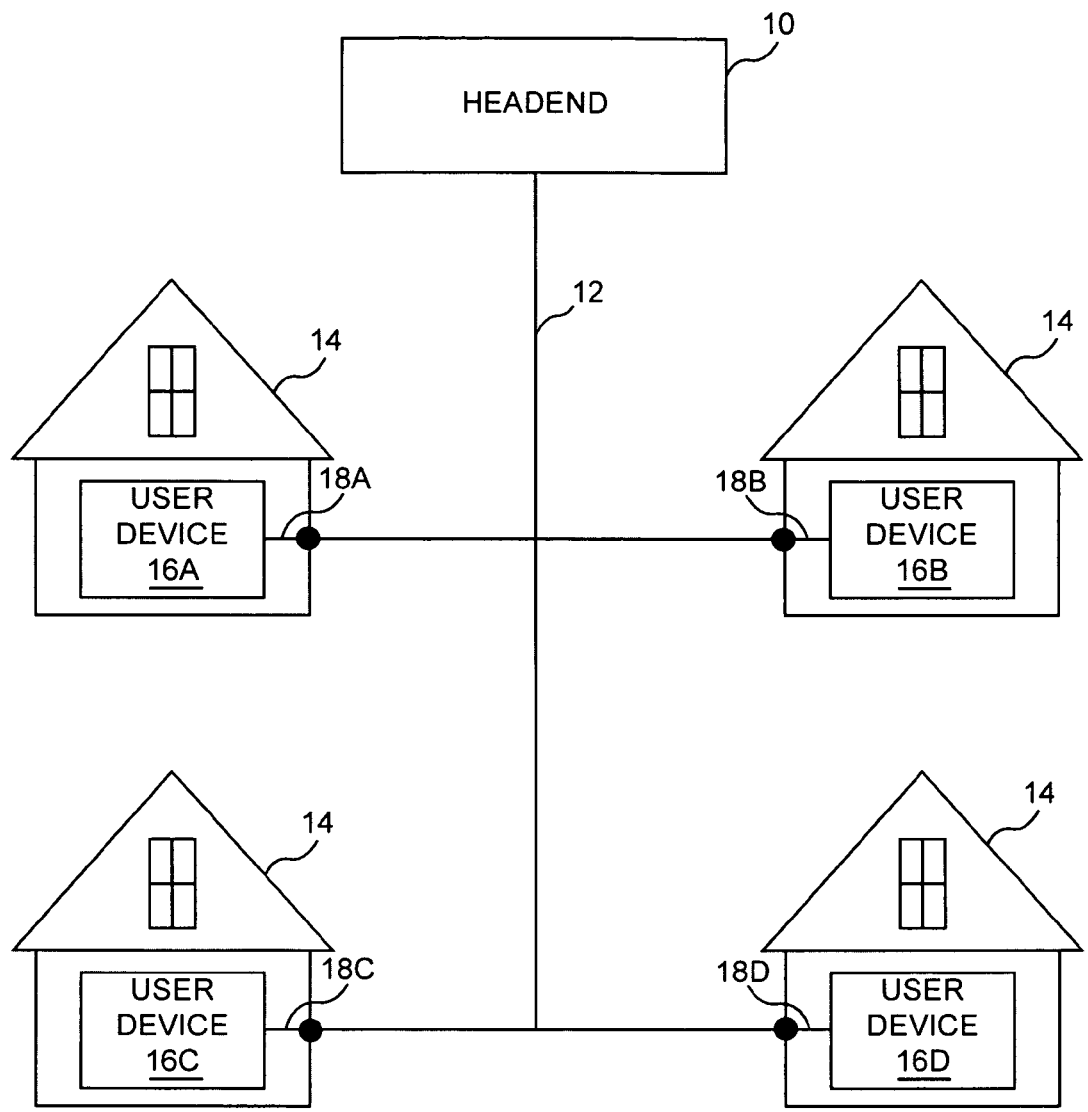
FIG. 1 is a diagram of a cable infrastructure suitable for implementing aspects of the present invention according to one embodiment of the invention.

The present invention enables service providers to recover shared medium bandwidth that was utilized to provide a low viewership feed so the bandwidth can be used for a service that the service provider deems preferable. FIG. 1 is a diagram of a cable infrastructure suitable for implementing aspects of the present invention in the context of a service provider, such as a multiple system operator (MSO), providing broadcast and video on demand services to a plurality of residences. A headend 10 provides programming services over a shared medium 12 to a plurality of residences 14. User devices 16A, 16B, 16C, and 16D are also coupled to the shared medium 12 via local links 18A, 18B, 18C, and 18D, respectively. For purposes of illustration and clarity, the user devices 16A, 16B, 16C, and 16D may be referred to singularly as the user device 16 or collectively as the user devices 16 when the discussion relates to user devices 16 generally rather than a specific user device 16A, 16B, 16C, or 16D. Likewise, the local links 18A, 18B, 18C, and 18D may be referred to singularly as the local link 18 or collectively as the local links 18 when the discussion relates to local links 18 generally rather than a specific local link 18A, 18B, 18C, and 18D.

The headend 10 can comprise any suitable equipment capable of providing one or more feeds to the user devices 16 for programming. A feed may comprise any type of data, such as a broadcast channel or a video on demand program. The feed can be a unicast feed received by a particular user device 16, or a multicast feed received by more than one user device 16. The cable infrastructure of a particular cable service provider typically includes a number of headends, and each headend provides feeds to a relatively large number of subscribers. While for purposes of illustration the shared medium 12 is shown as having a relatively simple configuration with connections to a number of residences 14, it is common for the shared medium 12 to comprise a relatively complex tree and branch hierarchy with multiple splitters and amplifiers to ensure sufficient signal strength to each residence, as will be apparent to those skilled in the art.

The user devices 16 can comprise any suitable equipment capable of interacting over a respective local link 18 and the shared medium 12 with the headend 10. The local links 18 can comprise any suitable wired or wireless technology capable of coupling the shared medium 12 with the respective user device 16. For example, the user device 16A may comprise a set top box, and the local link 18A may comprise a coaxial cable. The user device 16B may comprise a personal computer, and the local link 18B may comprise an Ethernet cable coupled to a cable modem that is in turn coupled to the shared medium 12. The user device 16C may comprise a wireless handheld device, and the local link 18C may comprise a wireless technology, such as 802.11 or Bluetooth, that is coupled to the cable modem. The user device 16D may comprise a cellular telephone and the local link 18D may comprise a cellular connection with a cell tower (not shown) that is coupled to the shared medium 12. Each of the user devices 16 typically has an associated display device (not shown). For example, the user device 16A may have a television monitor, the user device 16B may have a liquid crystal display (LCD) computer monitor, and the user devices 16C and 16D have may integrated LCD screens. While for purposes of illustration each residence 14 is shown as having a single user device 16, in practice a residence 14 can have many user devices 16.

The headend 10 preferably implements a technology such as switched digital video, or the like, that enables the headend 10 to provide television programming feeds over the shared medium 12 on an as-requested basis. Thus, even though the service provider may offer a viewer access to 150 channels of television, only those channels that have been requested by a user device 16 are being provided over the shared medium 12. The ability to selectively provide a broadcast feed over the shared medium 12 reduces bandwidth utilization of the shared medium 12 and, at peak usage times, enables the service provider to provide more services than would otherwise be available if all broadcast channels were always provided over the shared medium 12 irrespective of whether each channel was actually begin viewed by at least one viewer. Unfortunately, for channels of a particular resolution, such as standard definition or high definition, each feed requires generally the same bandwidth regardless of whether the feed has one viewer or 500 viewers. Thus, at peak usage times, the service provider may be unable to fulfill a relatively high profit video on demand request by a subscriber because of one or more viewers of low viewership feeds using bandwidth of the shared medium 12. From the service provider's perspective, in such a situation it would be preferable if the viewers of low viewership feeds could be influenced to switch from the low viewership feed to a high viewership feed, so the bandwidth associated with the low viewership feed could be used for a more profitable service.

Figure 2:
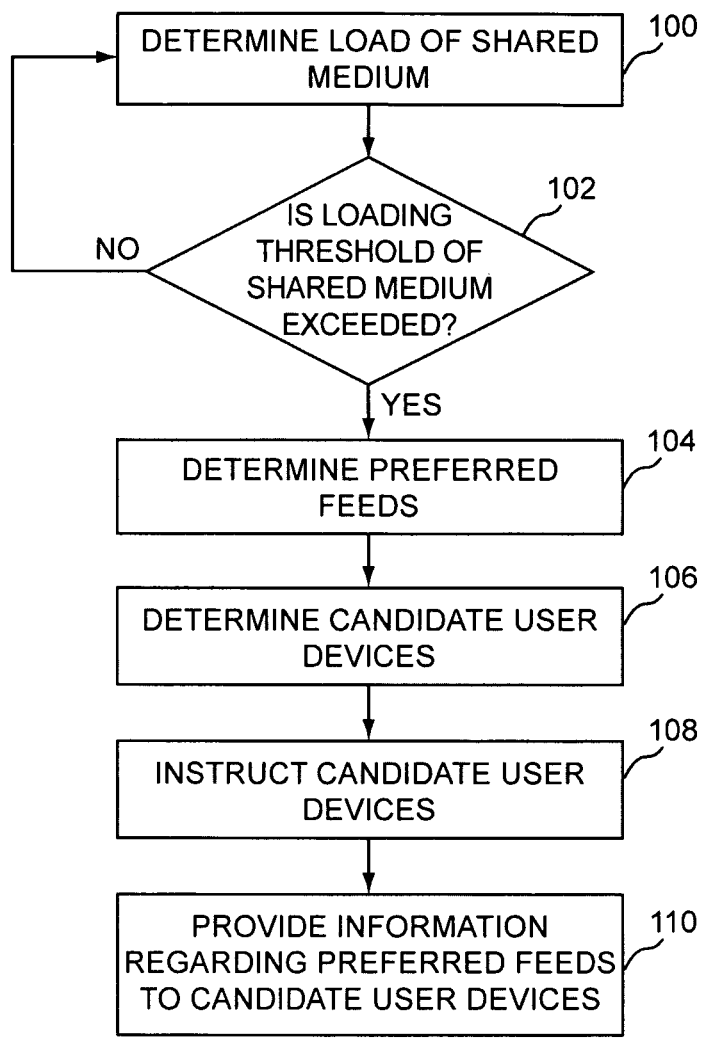
FIG. 2 is a flow chart illustrating a process for instructing a user device to influence viewers to select a second feed according to one embodiment of the invention.

FIG. 2 is a flow chart illustrating a process according to one embodiment of the invention for instructing a user device 16 to influence viewers to select a second feed. For purposes of illustration the flow chart will be described from the perspective of the headend 10 shown in FIG. 1. The headend 10 preferably continuously monitors the current load of the shared medium 12 (step 100). The current load can be quantified by the service provider in any suitable manner. For example, the current load can be quantified in terms of a ratio of a percentage of bandwidth of the shared medium 12 currently used to a total available bandwidth of the shared medium 12, a total number of viewers using the shared medium 12, a ratio of a number of revenue-generating feeds being provided over the shared medium 12 to a number of non-revenue generating feeds being provided over the shared medium 12, a ratio of a number of multicast feeds being provided over the shared medium 12 to a number of unicast feeds being provided over the shared medium 12, or per feed bandwidths.

The headend 10 also preferably continuously compares the current load to a loading threshold (step 102). The loading threshold will typically be a predetermined quantity defined in the same terms as the criteria used to determine the current load. For example, if the current load is determined as a function of a ratio of bandwidth of the shared medium 12 currently used to a total available bandwidth of the shared medium 12, a suitable threshold may be 75%, indicating that when the ratio of bandwidth of the shared medium 12 currently being used exceeds 75% of the total bandwidth available of the shared medium 12, the current load exceeds the loading threshold. If the current load does not exceed the loading threshold, the process returns to step 100. If the current load exceeds the loading threshold, the headend 10 determines preferred feeds from the plurality of feeds being provided over the shared medium 12 (step 104). Preferred feeds can be selected by any suitable criteria including the number of viewers of a feed, a time period since the last segment of video associated with a feed began, and current or historical viewership metrics associated with the feed. The number of preferred feeds selected may be a predetermined number, such as the three feeds with the highest viewership, or may depend on the criteria used to determine a preferred feed, for example, each feed having more than 300 viewers may be deemed a preferred feed.

The headend 10 also determines candidate user devices 16 currently providing a first feed for display to a viewer that should be instructed to influence the viewer to select a second feed (step 106). The headend 10 may determine candidate user devices 16 by any method that the respective service provider deems appropriate, including, for example, through the use of criteria such as whether the user device 16 is providing a unicast feed or a multicast feed and, if a unicast feed, whether the unicast feed is a broadcast feed or a revenue producing video on demand feed, how long the viewer has been receiving the feed, starting and ending times of the program currently being provided on the feed, or the number of viewers of the feed. The headend 10 instructs the candidate user devices 16 to influence the respective viewer to select a second feed selected from the preferred feeds (step 108), and provides information regarding the preferred feeds to the candidate user devices 16 (step 110). The headend 10 may provide the instruction and information regarding the preferred feeds directly to the candidate user devices 16, or via a common metadata multicast feed that is continually monitored by all user devices 16. The information regarding the preferred feeds can include: a) an activation loading threshold, wherein if the activation loading threshold is exceeded by the current load of the shared medium, a need exists to influence viewers to select a second feed; b) the current load of the shared medium; c) a deactivation loading threshold indicating the need to influence viewers to select a second feed no longer exists; d) specific user device addresses or identifiers identifying candidate user devices; and e) information identifying preferred feeds and metadata associated with the preferred feeds. The metadata may include any relevant information about the programming on that respective preferred feed, such as a channel number, a name of the program, a description of the program, actors in the program, and the like.

Figure 3:
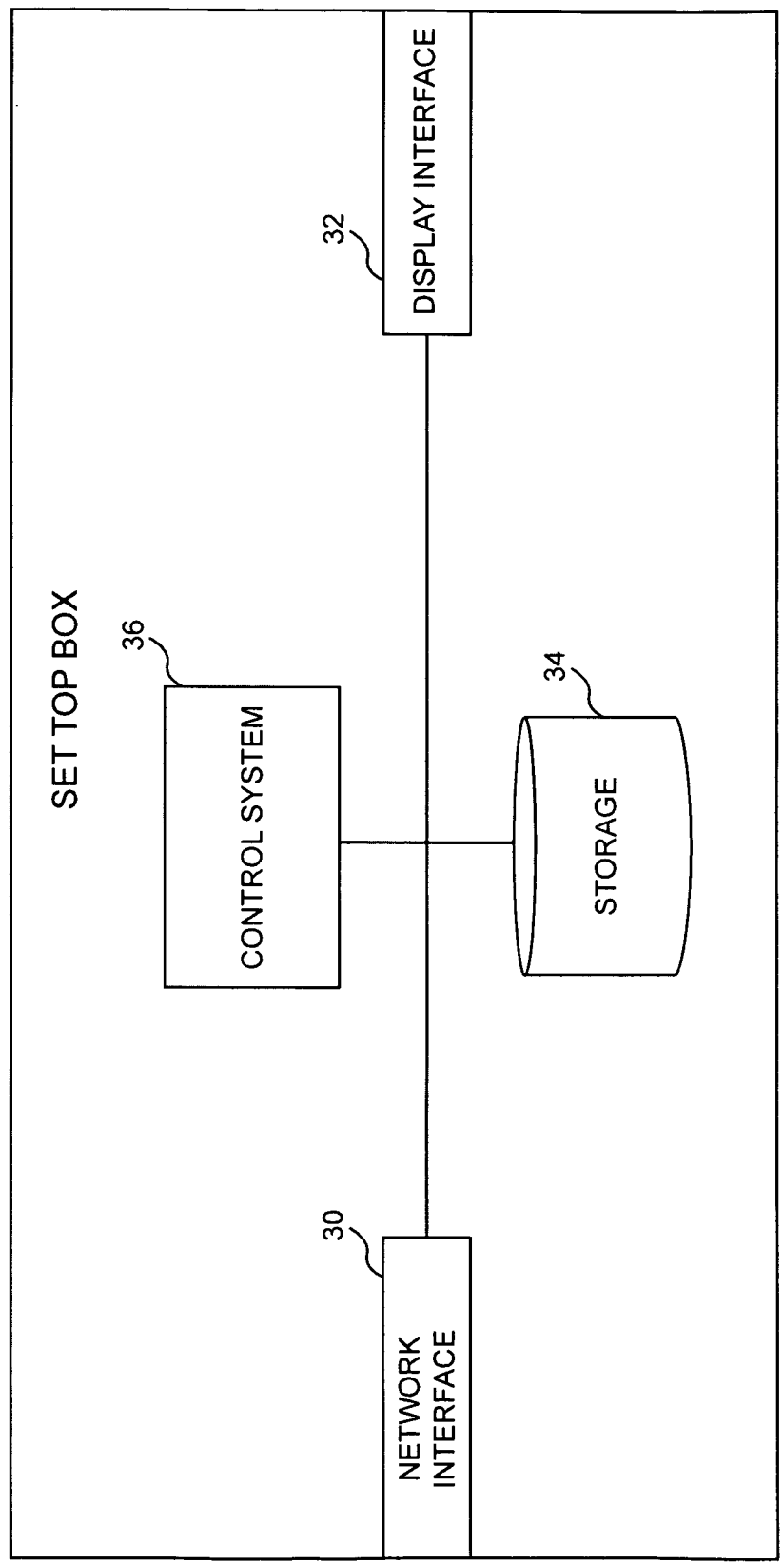
FIG. 3 is a block diagram of a user device according to one embodiment of the invention.

FIG. 3 is a block diagram of a user device 16 illustrated in FIG. 1 according to one embodiment of the invention. The user device 16 includes a network interface 30 for communicating with the shared medium 12 either directly or via another communications link, such as the local link 18. A display interface 32 interfaces with a display device suitable for the respective user device 16. A storage 34 can be used to buffer second content from a second feed prior to providing the second content for display to the viewer. The storage 34 can comprise any suitable electronic storage such as a hard disk drive or random access memory. The storage 34 may be integral with the user device 16, or may be independent of the user device 16 but coupled to the user device 16 over a relatively high speed communications channel, such as an Ethernet cable or a Universal Serial Bus (USB) cable. A control system 36 contains a memory, software, and circuitry (not shown) configured to implement the functionality described herein. The control system 36 can include a general purpose processor that executes one or more programs developed in a conventional or proprietary programming language, and can comprise specialized circuitry adapted to provide all or a portion of the functionality described herein. As discussed previously, the user device 16 can be implemented in any suitable equipment capable of providing programming to a viewer, such as a set top box, a computer, a cell phone, and the like.

Figure 4:
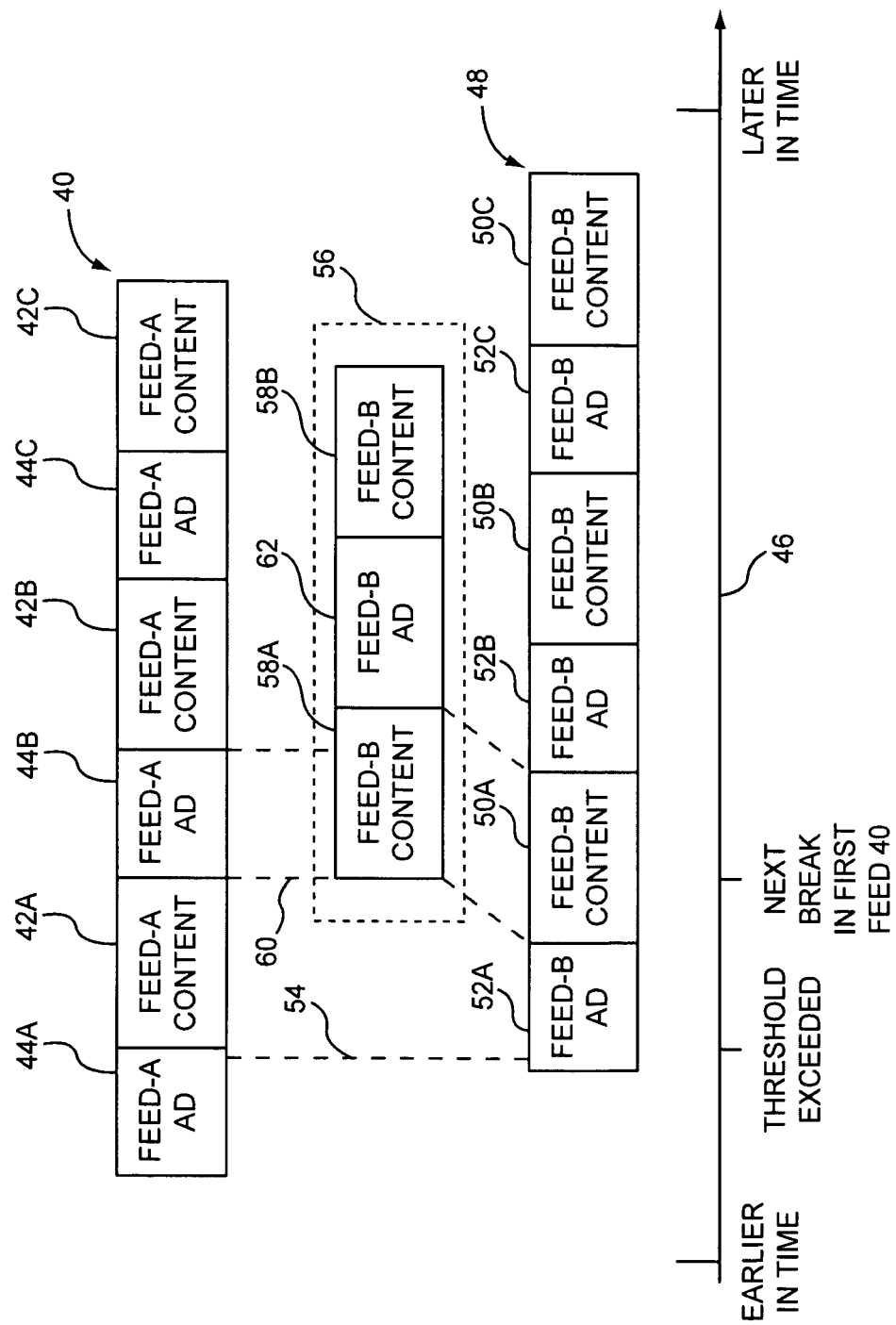
FIG. 4 is a block diagram illustrating first and second feeds provided over a shared medium according to one embodiment of the invention.
Figure 5:
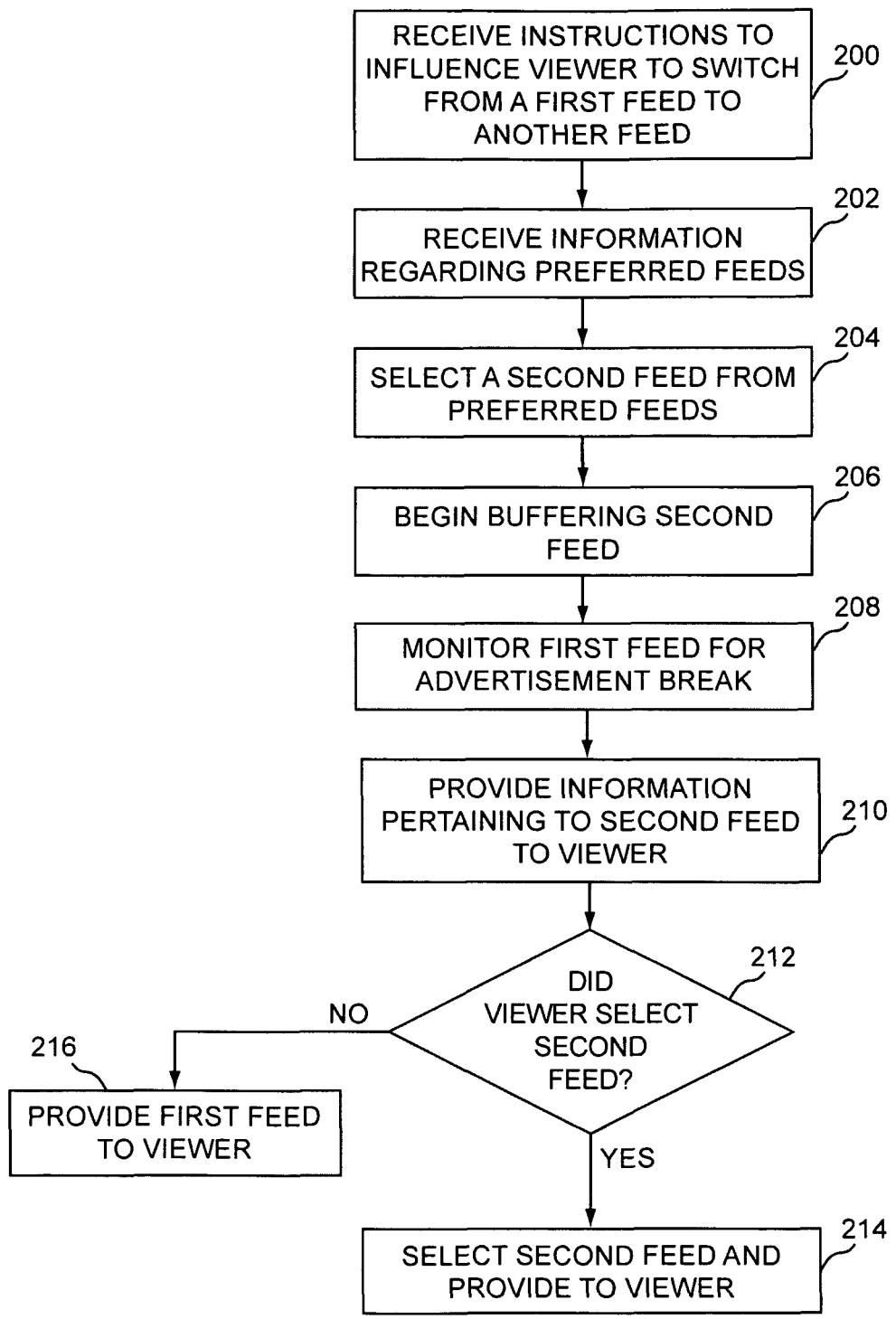
FIG. 5 is a flowchart illustrating a process for influencing a viewer to select a second feed according to one embodiment of the invention.

FIG. 4 is a block diagram illustrating first and second feeds provided over a shared medium 12 according to one embodiment of the invention, and FIG. 5 is a flowchart illustrating a process for influencing a viewer to select a second feed according to one embodiment of the invention. For purposes of illustration FIGS. 4 and 5 will be discussed together. Referring first to FIG. 4, a first feed 40 comprises a plurality of content segments 42A, 42B, and 42C and a plurality of advertisements 44A, 44B, and 44C that is being provided to a user device 16. A time bar 46 indicates the passage of time. As such, the leftmost portion of the first feed 40, in this example the advertisement 44A, is presented by the user device 16 for display to the viewer prior to a portion of the first feed 40 that is present to the right of the advertisement segment 44A, in this example the content segment 42A. A second feed 48 also has a plurality of content segments 50A, 50B, and 50C and a plurality of advertisements 52A, 52B, and 52C and is being provided to another user device 16. For purposes of illustration, it will be assumed that the first feed 40 is a low viewership feed and the second feed 48 is a high viewership feed. A determination of what constitutes a low viewership feed and a high viewership feed may be made by a respective service provider. According to one embodiment of the invention, a service provider may define a low viewership feed as a feed being viewed by a number of viewers less than a first predetermined number of viewers, and a high viewership feed as a feed being viewed by a number of viewers greater than a second predetermined number of viewers. According to another embodiment, a low viewership feed is a first feed having a lower number of viewers than a second feed that has a higher number of viewers.

It should be understood that the first feed 40 and the second feed 48 are typically provided in a stream of data over the shared medium 12 at a preferred bit rate over the course of time, so that not all of the first feed 40 or the second feed 48 are present on the shared medium 12 at the same time. For example, while the advertisement 44A is being received by the user device 16, the content segment 42A is likely stored on the headend 10. A time marker 54 represents a point in time when the headend 10 has determined that a loading threshold of the shared medium 12 has been exceeded and has determined that the user device 16 receiving the first feed 40 is a candidate user device 16. The user device 16 receives instructions from the headend 10 to influence the viewer to select a second feed (step 200, FIG. 5). The user device 16 also obtains information regarding one or more preferred feeds (step 202, FIG. 5). The user device 16 selects the second feed 48 from the preferred feeds (step 204, FIG. 5). If there is more than one preferred feed, the user device 16 may select the second feed 48 randomly from the plurality of preferred feeds, or based on information relating to the viewer, based on information maintained in a profile of the subscriber associated with the user device 16. The profile may include channel preferences or personal information about the subscriber that might be useful in selecting the second feed 48.

The user device 16 begins to monitor the second feed 48 and at the next content segment of the second feed 48, which in this example is the content segment 50A, begins to buffer the content segment 50A to a buffer 56 maintained in a memory of the user device 16, or in the storage 34 (step 206, FIG. 5). The buffered content segment from the second feed 48 is shown in FIG. 4 as a buffered content segment 58A. In an alternate embodiment, preferred feeds may be continually identified on the metadata multicast channel, even prior to the loading threshold being exceeded, and the user device 16 may continuously buffer content from the second feed 48 to the buffer 56. In such an embodiment, the user device 16 may be able to provide the information relating to the second feed 48 for display to the viewer sooner than the user device 16 would be able to otherwise. Also in such an embodiment, the buffer 56 can be continually overwritten with the next content segment of the second feed 48. In yet another embodiment, the user device 16 can select multiple second feeds 48 from the plurality of preferred feeds, and begin buffering content segments of each of the plurality of second feeds 48 into one or more buffers 56. In this embodiment, the user device 16 can provide information relating to multiple second feeds 48 for display to the viewer, potentially increasing a likelihood the viewer will select one of the second feeds 48, freeing up bandwidth consumed by the first feed 40.

The user device 16 monitors the first feed 40 for the next advertisement break (step 208, FIG. 5). A time marker 60 represents the point in time of the next advertisement break in the first feed 40. The user device 16 provides information pertaining to the second feed 48 for display to the viewer (step 210, FIG. 5). The information can comprise an overlay describing the programming on the second feed 48, and can include a selectable feature that enables the viewer to easily select the second feed 48. Alternately, the information may be the buffered content segment 58A from the second feed 48 alone, or in combination with such an overlay. The information may be provided in place of the advertisement 44B, or may be provided in a picture-in-picture display, enabling the viewer to view both the advertisement 44B and the information pertaining to the second feed 48. The overlay may include text encouraging the viewer to select the second feed 48. If the user device 16 provides the information pertaining to the second feed 48 in place of the advertisement 44B, or the viewer otherwise selects the second feed 48 and the advertisement 44B is not provided for display to the viewer in part, or in its entirety, the user device 16 can notify the headend 10 that the advertisement 44B was not provided for display to the viewer. The user device 16 can generate a unique key that identifies the user device 16, the advertisement 44B and the first feed 40. According to one embodiment of the invention, the headend 10 may track the number of viewers of each feed being provided over the shared medium 12 for purposes of charging an advertiser. The key can be communicated over the shared medium 12 to the headend 10 so that the advertiser can be credited since the advertisement 44B was not provided for display to the viewer.

If the viewer selects the second feed 48 (step 212, FIG. 5), the user device 16 indicates to the headend 10 that the second feed 48 has been selected and continues to provide the second content from the second feed 48 from the buffer 56 (step 214, FIG. 5). The user device 16 can continue to buffer the second feed 48, such as buffered advertisement 62 and buffered content segment 58B, to the buffer 56 and provide the second content from the buffer 56, or can use a conventional algorithm that intelligently speeds up video in a manner that is not noticeable to the viewer. In this way, the second content being provided from the buffer 56 will ultimately be in time synchronization with the second content being provided over the shared medium 12, and at that point the user device 16 can provide the second content directly from the second feed 48 and stop buffering the second content in the buffer 56. Upon selection of the second feed 48, the user device 16 can also generate a second unique key that informs the headend 10 that the viewer was successfully influenced to select the second feed 48, and identify the second feed 48.

If at the end of the time allocated for the advertisement 44B the viewer does not select the second feed 48, the user device 16 can provide the first feed 40 beginning with the next content segment 42B for display to the viewer (step 216, FIG. 5). At the time of the next advertisement 44C, the process can start over with another second feed from the plurality of preferred feeds (step 204, FIG. 5).

Those skilled in the art will recognize improvements and modifications to the preferred embodiments of the present invention. All such improvements and modifications are considered within the scope of the concepts disclosed herein and the claims that follow.

What is claimed is:
1. A method for influencing a viewer to select another feed comprising:
receiving, by a user device from a headend, a first feed provided over a shared medium, wherein the first feed comprises a first program and at least certain feeds provided over the shared medium are accessible by a plurality of different user devices each associated with a corresponding different subscriber;
effecting display of first content from the first feed to the viewer;
receiving instructions, by the user device from the headend, over the shared medium to influence the viewer to select a feed other than the first feed when a loading threshold of the shared medium is exceeded;
receiving, from the headend, an identification of at least one second feed which the viewer is to be influenced to select;

in response to receiving the instructions, effecting display of information pertaining to the at least one second feed to the viewer;

in response to input from the viewer to select the at least one second feed, selecting the at least one second feed provided over the shared medium and effecting display of second content from the at least one second feed to the viewer; and communicating, from the user device to the headend, information indicating the viewer has selected the at least one second feed.

2. The method of claim 1 further comprising receiving information identifying a plurality of feeds other than the first feed, and wherein the at least one second feed is one of the plurality of feeds.

3. The method of claim 2 wherein the at least one second feed is chosen from the plurality of feeds based on subscriber information associated with a subscriber of the first feed.

4. The method of claim 1 wherein the information pertaining to the at least one second feed is configured to influence the viewer to select the at least one second feed.

5. The method of claim 1 wherein the information pertaining to the at least one second feed comprises the second content from the at least one second feed.

6. The method of claim 5 further comprising buffering the second content from the at least one second feed to a storage device before effecting display of the second content to the viewer.

7. The method of claim 1 wherein effecting display of the information pertaining to the at least one second feed to the viewer further comprises effecting display of the information pertaining to the at least one second feed to the viewer in place of an advertisement that was to be displayed to the viewer.

8. The method of claim 7 further comprising notifying the headend that the advertisement was not displayed to the viewer.

9. The method of claim 1 wherein the information pertaining to the at least one second feed comprises an overlay describing the second content from the at least one second feed.

10. The method of claim 1 wherein receiving the instructions over the shared medium to influence the viewer to select the feed other than the first feed further comprises monitoring a multicast channel for instructions to influence the viewer to select the feed other than the first feed.

11. The method of claim 1 wherein the first feed is determined to have a low viewership, and the at least one second feed is determined to have a high viewership.

12. The method of claim 11 wherein the low viewership comprises a number of viewers less than or equal to a first predetermined number of viewers, and the high viewership comprises a number of viewers greater than or equal to a second predetermined number of viewers.

13. The method of claim 1 wherein the user device comprises a set top box.

14. A method for influencing a viewer comprising:

providing, by a headend, a first feed over a shared medium to a first user device, wherein the first feed comprises a first program;

determining, by the headend, that a loading threshold of the shared medium is exceeded;

identifying at least one second feed that is currently being provided over the shared medium and being accessed by one or more user devices other than the first user device;

sending instructions over the shared medium to direct the first user device to influence the viewer to select the at least one second feed in lieu of the first feed in response to determining that the loading threshold of the shared medium is exceeded;

receiving information that the user device has selected the at least one second feed; and in response to receiving information that the user device has selected the at least one second feed, terminating the first feed over the shared medium.

15. The method of claim 14 further comprising receiving an indication that an advertisement associated with the first feed was not provided for display to the viewer, and effecting a credit of an account associated with the advertisement.

16. An apparatus for influencing a viewer to select another feed comprising:

a network interface for communicating with a network; and a control system coupled to the network interface and adapted to:

receive, by the apparatus from a headend, a first feed provided over a shared medium, wherein the first feed comprises a first program and at least certain feeds provided over the shared medium are accessible by a plurality of different apparatus each associated with a corresponding different subscriber;

effect display of first content from the first feed to the viewer;

receive instructions, by the apparatus from the headend, over the shared medium to influence the viewer to select a feed other than the first feed when a loading threshold of the shared medium is exceeded;

receive, from the headend, an identification of at least one second feed which the viewer is to be influenced to select;

in response to receiving the instructions, effect display of information pertaining to the at least one second feed to the viewer;

in response to input from the viewer to select the at least one second feed, select the at least one second feed provided over the shared medium and effect display of second content from the at least one second feed to the viewer; and communicate, from the apparatus to the headend, information indicating the viewer has selected the at least one second feed.

17. The apparatus of claim 16 wherein the control system is further adapted to receive information identifying a plurality of feeds other than the first feed, and wherein the at least one second feed is one of the plurality of feeds.

18. The apparatus of claim 17 wherein the at least one second feed is chosen from the plurality of feeds based on subscriber information associated with a subscriber of the first feed.

19. The apparatus of claim 16 wherein the information pertaining to the at least one second feed comprises second content from the at least one second feed.

20. The apparatus of claim 16 wherein to effect display of the information pertaining to the at least one second feed to the viewer, the control system is further adapted to effect display of the information pertaining to the at least one second feed to the viewer in place of an advertisement that was to be displayed to the viewer.

21. The apparatus of claim 20 wherein the control system is further adapted to notify the headend that the advertisement was not displayed to the viewer.

* * * * *